United States Patent [19]

Krenz

[11] 4,171,786

[45] Oct. 23, 1979

[54] AIRCRAFT WING WITH ENGINE MOUNT

[75] Inventor: Günter Krenz, Bremen, Fed. Rep. of Germany

[73] Assignee: Vereinigte Flugtechnische Werke-Fokker GmbH, Bremen, Fed. Rep. of Germany

[21] Appl. No.: 832,958

[22] Filed: Sep. 13, 1977

[30] Foreign Application Priority Data

Sep. 15, 1976 [DE] Fed. Rep. of Germany ....... 2641468

[51] Int. Cl.² .................. B64C 3/32; B64D 27/02; B64D 27/26

[52] U.S. Cl. ........................ 244/54; 244/55; 244/45 R

[58] Field of Search ............. 244/13, 15, 45 R, 45 A, 244/54, 55, 12.1; D12/71, 77, 78, 80

[56] References Cited

U.S. PATENT DOCUMENTS

| | | | |
|---|---|---|---|
| D. 180,846 | 8/1957 | Rocco | D12/71 |
| D. 191,930 | 12/1961 | Cella | D12/71 |
| 2,584,961 | 2/1952 | Beck et al. | 244/55 |
| 3,018,983 | 1/1962 | Davidson | 224/15 |
| 3,195,837 | 7/1965 | Alvarez-Calderon | 244/55 |
| 3,289,975 | 12/1966 | Hall | 244/55 |

FOREIGN PATENT DOCUMENTS

| | | | |
|---|---|---|---|
| 1178843 | 5/1959 | France | 244/12.1 |
| 702290 | 3/1966 | Italy | 244/55 |
| 1030521 | 5/1966 | United Kingdom | 244/54 |
| 1385390 | 2/1975 | United Kingdom | 244/55 |

*Primary Examiner*—Galen L. Barefoot
*Attorney, Agent, or Firm*—Smyth, Pavitt, Siegemund, Jones & Martell

[57] ABSTRACT

An aircraft engine is mounted above and spaced apart from the upper side of a wing by means of a supplemental wing being above and ahead of the main wing. Particular parameters for this mounting arrangement are given so that the jet clears the upper wing surface but accelerates the flow there above. The omission of a pylon on the wing is another drag reducing feature.

5 Claims, 5 Drawing Figures

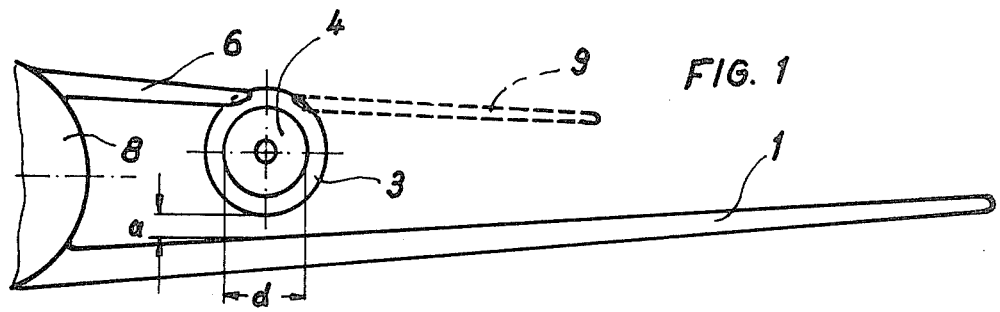
FIG. 1
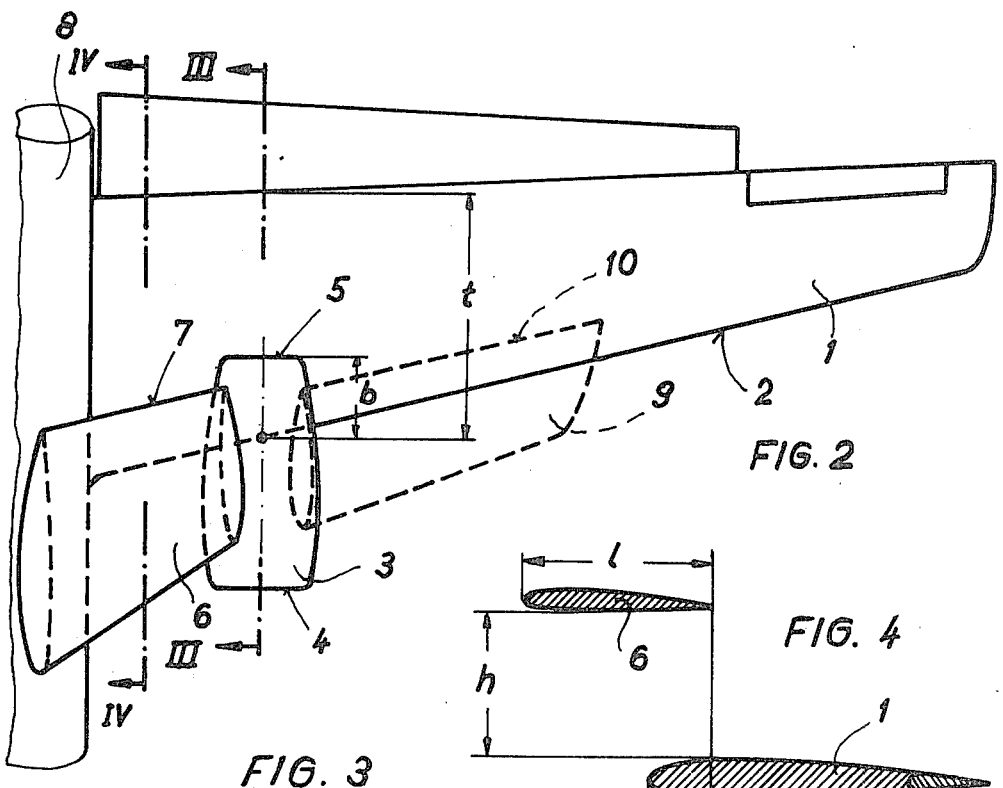
FIG. 2
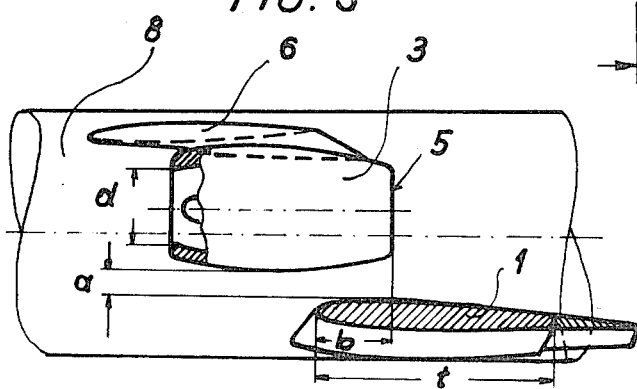
FIG. 3
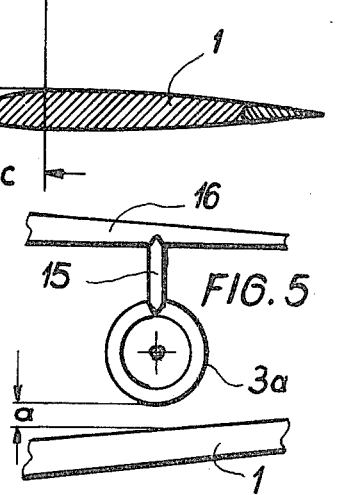
FIG. 4
FIG. 5 dance with the preferred embodiment of the present invention;

AIRCRAFT WING WITH ENGINE MOUNT

BACKGROUND OF THE INVENTION

The present invention relates to aircrafts having engines mounted above the wings, the air intakes being disposed ahead of the leading edge of the respective wing.

U.S. Pat. No. 3,018,983 describes an aircraft in which the engines are mounted on pylons which extend above as well as in forward direction from the wings. Alternatively, the engines are directly mounted on top of the wings. In the former case, the engine produces a jet which remains above the wing and flows at some distance therefrom while, in the latter case, the emerging jet is tangent to the wing.

Mounting the engines on top of the wings has certain advantages in general, but it was found that the air flow around the pylons and/or along the engines interferes with the flow across the wings and, therefore, produces additional drag. Also, the mere fact of mounting such pylons reduces the surface area of the wings participating in the production of lift.

The German printed patent application No. 1,803,132 discloses an aircraft having several wings arranged one behind the other and carrying engines on their respective ends. The purpose of this arrangement is to produce jets which flow along both sides of the respective wing being disposed behind the engine producing such a jet. This arrangement, however, has the drawback that the hot jet exposes the wing to considerable thermal load. The interference mentioned above is also present as to each wing carrying an engine.

DESCRIPTION OF THE INVENTION

It is an object of the present invention to avoid the above mentioned interferences, drag and lift reducing effects in a manner neither suggested nor made obvious by and in the references mentioned above.

In accordance with the preferred embodiment of the present invention, it is suggested to provide a supplemental wing above and ahead of a main wing of the aircraft and to depend on engines from the supplemental wing, either from the tip thereof, or directly in between the span extension of the supplemental wing or by means of a pylon, whereby in either case, the engine remains spaced from the main wing by a distance which is preferably between 10% to 50% of the air intake diameter. Certain other geometric preferences will be explained below.

The main advantage of the invention is to be seen in that the main wing flow is free from interferences from the engine intake and engine mount. Rather, the engine jet stream and the mount supplement the lift production, permitting a reduction in wing dimensions as far as design is concerned. While the prior art pylon mount of an engine increases drag, the engine mount as per the present invention increases lift and, separately, reduces drag. The supplemental wing introduces an advantageous twin wing effect increased by engine jet and twin wing interference.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a (partial) front view of an aircraft in accordance with the preferred embodiment of the present invention;

FIG. 2 is a top view of the aircraft as shown in FIG. 1;

FIG. 3 is a section as per lines III—III in FIG. 2;

FIG. 4 is a section as per lines IV—IV in FIG. 2; and,

FIG. 5 is a front view of a modification of a engine mount as per FIG. 1.

Proceeding now to the detailed description of the drawings, FIGS. 1 and 2 show a fuselage 8 from which extends a wing 1. Of course, a second wing extends from the other side of fuselage 8, in symmetric relation to a vertical plane through the longitudinal center axis of the fuselage. It can readily be seen that an engine 3 (a) is disposed above the wing 1 but (b) is not mounted on the wing. Rather, a short wing 6 or fin is provided and extends from fuselage 8 above wing 1, and engine 3 is suspended from that supplemental wing 6.

Considering the engine mount 3 further, it can be seen that the air intake 4 is disposed well ahead of the leading edge 2 of wing 1, but the jet exit (plane) 5 is disposed behind that edge 2. Accordingly, wing 6 is disposed generally above and ahead of wing 1 but establishes therewith a twin wing or biplane system. In order to reinforce this generally advantageous type of wing system, wing 6 may be extended by the additional wing portion 9 which is, however, an optional feature and not essential as far as the engine mount is concerned. The wing portion 9 is the aerodynamic continuation of wing 6 and is, therefore, disposed above and somewhat ahead of wing 1.

The geometry of the wing-engine-mount configuration is important as to its detail. FIG. 3 illustrates particularly the vertical disposition of the engine 3 in relation to wing 1. The bottom level of engine 3 is disposed above the highest level of wing 1 by a distance a, and the jet exit plane 5 is located rearwardly from the leading edge 2, and at a distance b therefrom, whereby this particular distance b has validity only in a vertical plane through the center axis of the engine due to the oblique extension of that particular wing edge 2. Moreover, this distance is to be understood in a vertical protection into a common horizontal plane as far as the jet exit itself is concerned. Another relevant parameter is the wing chord or depth t, measure across wing 1 but in a vertical plane which traverses the center axis of engine 3.

The geometry of the preferred engine disposition can be referenced to the inner diameter d of the air intake of the engine 3 in the following manner. The vertical displacement or elevation a of engine 3 in relation to wing 1 is from 10% to 50% of the diameter d. The rear displacement b as defined, is from 10% to 30% of the depth or chord t of the wing 1. It was found that, if the values a and b are determined in accordance with these rules, one obtains hardly any negative interference of the air flow along wing 1 by the air flow along engine 3. Rather, the air flow above the wing 1 is interfered with in a positive manner by the engine jet as the latter accelerates the surrounding air including the flow above wing 1. In particular, the air flow above wing 1 is subjected to an ejection effect produced by the jet as emerging from exit 5. (*) Consequently, the jet reduces drag and increases the lift. On the other hand, the jet remains sufficiently far from the upper surface 1 of the wing, due to the combined effect of the distance a and the rear displacement b as referenced to the depth t, so that a thermal load is not exerted by the hot jet upon the wing structure and its skin. The skin is thermally isolated from the hot jet by the air flow above and across the wing, particularly as accelerated by the jet itself.

(*) In the case of a bypass engine the exit plane 5 is defined to be the exit plane of the bypass jet.

FIG. 4 illustrates the relationship between the two wings 1 and 6 in a vertical plane. The same considerations can be made in regard to supplemental wing 9 if provided. The wing chord or depth t or wing 1 is used here as a reference. The disposition of wing 6 relative to wing 1 is defined by a vertical displacement or elevational value h and by an overlap displacement c, both as defined in FIG. 4. Distance h is the vertical distance of the upper level of wing 1 from the lower level of wing 6. The overlap c is the displacement of the trailing edge 7 of wing 6 from the leading edge 2 of wing 1, taken e.g. in a vertical projection into a common horizontal plane, i.e. c is a measure indicating the overlap according to which the trailing edge of the supplemental wing is behind the leading edge of wing 1 in the direction of flight.

In accordance with the preferred configuration, h is about 70% to 100% of wing chord t. As can be seen from FIGS. 1 and 2, decreasing wing chord t concurs with a diminishing distance of wings 6, 9 from wing 1 so that the relation between these parameters will stay within the stated range, at least for most of the wings 6, 9. In addition, parameter c is about 10% to 30% of t. This configuration establishes a twin wing or biplane effect causing the airflow above wing 1 to be accelerated so that the lift is increased accordingly. The twin wing or biplane configuration per se does not increase drag. A similar lift augmentation results from the supplemental wing extension 9, and additional lift results from twin wing and engine jet interference.

If the fuselage is rather thick, compared with the engine diameter, the engine mount should be modified as shown in FIG. 5. The supplemental wing 16 has a larger span but is in toto comparable to the wing assembly 6, 9. A pylon 15 is used to mount engine 3a so that the bottom thereof has a distance a from wing 1 in accordance with the rule stated above. All the other rules are equally applicable to this example and should be observed.

The engine and wing arrangement as described has the following advantages. The free disposition of the engine (3, 3a) in relation to and above the wing 1 causes the air flow above wing 1 to be accelerated resulting in an increase in lift and in a corresponding reduction of the drag as compared with a pylon mounted engine. It should be noted here that the pylon 15 in FIG. 5 does not interfere with the air flow above main wing 1. In addition, the mere omission of a pylon on wing 1 is a direct reduction of the interference and surface drag. The third advantage is also related to the omission of the pylon in that the wing area heretofore occupied by the pylon, is also available for producing lift. The fourth advantage is increased lift by twin wing and jet interference. As a consequence of these advantages, the wing can be made smaller, reducing the drag further. As far as aircraft design is concerned, further development can be based on a given wing configuration and design, while further adaptations and other modifications may be restricted to the supplemental wings (6, 9, 16) only which is, of course, as cost reducing aspect.

The invention is not limited to the embodiments described above but all changes and modifications thereof not constituting departures from the spirit and scope of the invention are intended to be included.

I claim:

1. In an aircraft, having a fuselage from which extends a main wing, further having a jet engine having an air intake of particular diameter and being disposed so that the air intake is ahead of the leading edge of the wing, the improvement comprising:
a supplemental wing, being shorter than the main wing, and extending from the fuselage above the main wing and at a spacing in which a lower surface of the supplemental wing is spaced from an upper surface of the main wing by a distance larger than about 70%, but smaller than 100% of a chord depth of the main wing in a plane through a center axis of the engine, said supplemental wing having a leading edge disposed ahead of the leading edge of the main wing, the trailing edge of the supplemental wing being behind the leading edge of the main wing but well in front of the trailing edge of the main wing in the direction of flight, the engine being mounted to the supplemental wing and at a spacing from the main wing being between 10% and 50% of said inner diameter, the engine having an exit plane displaced from the leading edge of the main wing by 10% to 40% of said chord depth.

2. In an aircraft as in claim 1, the engine being mounted to the tip of the supplemental wing.

3. In an aircraft as in claim 1, wherein the supplemental wing has an span extension beyond the engine.

4. In an aircraft as in claim 1, wherein the engine is depending from the supplemental wing by means of a pylon.

5. In an aircraft as in claim 1, wherein the trailing edge of the supplemental wing is displaced by a distance from the leading edge of the wing, in a vertical projection in a horizontal plane, which distance is about 10% to 30% of the wing chord t.

* * * * *